United States Patent [19]

Martin et al.

[11] Patent Number: 5,386,515
[45] Date of Patent: Jan. 31, 1995

[54] AUTOMATIC INPUT/OUTPUT ADDRESS CONFLICT RESOLUTION

[75] Inventors: Phil Martin, Banks; Gary Alvstad, Beaverton, both of Oreg.

[73] Assignee: Intel Corporation, Santa Clara, Calif.

[21] Appl. No.: 889,458

[22] Filed: May 27, 1992

[51] Int. Cl.⁶ .............................................. G06F 13/00
[52] U.S. Cl. .................................... 395/275; 395/425; 364/240; 364/242.6; 364/242.93; 364/230.1; 364/DIG. 1
[58] Field of Search ........................ 395/275, 400, 425

[56] References Cited

U.S. PATENT DOCUMENTS 3,702,462 11/1972 England .............................. 395/275
3,810,105 5/1974 England .............................. 395/275

*Primary Examiner*—Robert L. Richardson
*Attorney, Agent, or Firm*—Blakely, Sokoloff, Taylor & Zafman

[57] ABSTRACT

A method and apparatus for automatically resolving I/O address conflicts among hardware adapters coupled to a common bus in a computer system. System I/O software tests each address space of a set of possible automatic conflict resolution (ACR) adapter address spaces for bus conflicts between the ACR adapters and non ACR adapters. For each address space having a conflict, the system I/O software shifts the address spaces of the ACR adapters to a next sequential address space of the set of possible address spaces. Thereafter, the system I/O software reallocates the address space of each ACR adapter, such that the address spaces of the ACR adapters do not overlap, and are not in conflict with the non ACR adapters.

21 Claims, 6 Drawing Sheets

AUTOMATIC INPUT/OUTPUT ADDRESS CONFLICT RESOLUTION

BACKGROUND OF THE INVENTION

1. Field of the Invention

This invention relates to the field of computer system architecture. More particularly, this invention relates to automatic I/O address conflict resolution for hardware adapters in a computer system.

2. Background of the Invention

A standard bus architecture is often used for coupling optional hardware adapters to a computer system. The optional hardware adapters can couple the computer system to peripheral components such as disk drives, networks and graphics devices. A CPU coupled to the standard bus configures and controls the adapters by accessing the internal registers of the adapters. Typically, the internal registers of the adapters are mapped into an I/O address space of the standard bus.

In computer systems using such a standard bus architecture, the internal registers of each adapter are mapped to separate portions of the I/O address space of the standard bus to prevent bus conflicts between the adapters. Typically, a default I/O address mapping for the adapters is preselected at the factory. The I/O address mapping may be programmed in hardware, or selected by switch settings or jumpers located on the adapter.

To install an adapter in a computer system, the default I/O address mapping may require change to prevent I/O address conflicts with other adapters already installed in the system. Ideally, a record of I/O address mapping for each adapter should be maintained to facilitate I/O address allocation for new adapters at installation time. In reality, such records are rarely maintained. Moreover, many standard bus architecture's provide no mechanism for automatically keeping track of the I/O addresses mapped to the adapters.

As a result, a hit or miss technique is often used, whereby I/O address mapping for a new adapter is arbitrarily selected at installation time. If the new adapter does not function properly with the arbitrary address mapping, then another I/O address mapping is selected. The hit or miss process repeats until the new adapter functions properly. The hit or miss technique becomes more cumbersome as the number of adapters installed in the system increases.

As will be described, the present method and apparatus automatically resolves I/O address conflicts among adapters coupled to a common bus in a computer system. The present method and apparatus detects address conflicts among the adapters, and modifies the I/O address mapping for the adapters to eliminate the conflicts.

SUMMARY OF THE INVENTION

A method and apparatus is disclosed for automatically resolving I/O address conflicts among adapters coupled to a common bus in a computer system. The present method and apparatus enables system I/O software to detect I/O address conflicts among the internal registers of the adapters, and to reallocate the I/O address mapping to eliminate the conflicts. Adapters that implement the current method and apparatus are referred to as automatic conflict resolution (ACR) adapters.

The system I/O software tests each address space of a set of possible ACR adapter address spaces for bus conflicts between the ACR adapters, and internal register addresses allocated to non ACR adapters. For each address space having a conflict between ACR adapters and non ACR adapters, the system I/O software shifts the address space of the ACR adapters to a next sequential address space of the set of possible address spaces. The sequence is repeated to ensure that the ACR adapters are shifted out of conflict with the non ACR adapters.

Thereafter, the system I/O software reallocates the address space of each ACR adapter, such that the address spaces of the ACR adapters do not overlap, and are not in conflict with the non ACR adapters. A bit switch function is implemented on each ACR adapter to selectively isolate ACR adapters mapped to the same address space.

DETAILED DESCRIPTION OF THE INVENTION

A method and apparatus is disclosed for automatically resolving I/O address conflicts among adapters coupled to a common bus in a computer system. The following description for purposes of explanation, specific circuit devices, circuit architecture's and components are set forth in order to provide a more thorough understanding of the present invention. However, it will be apparent to one skilled in the art that the present invention may be practiced without these specific details. In other instances, well known circuits and devices are shown in schematic form in order not to obscure the present invention unnecessarily.

Figure 1:
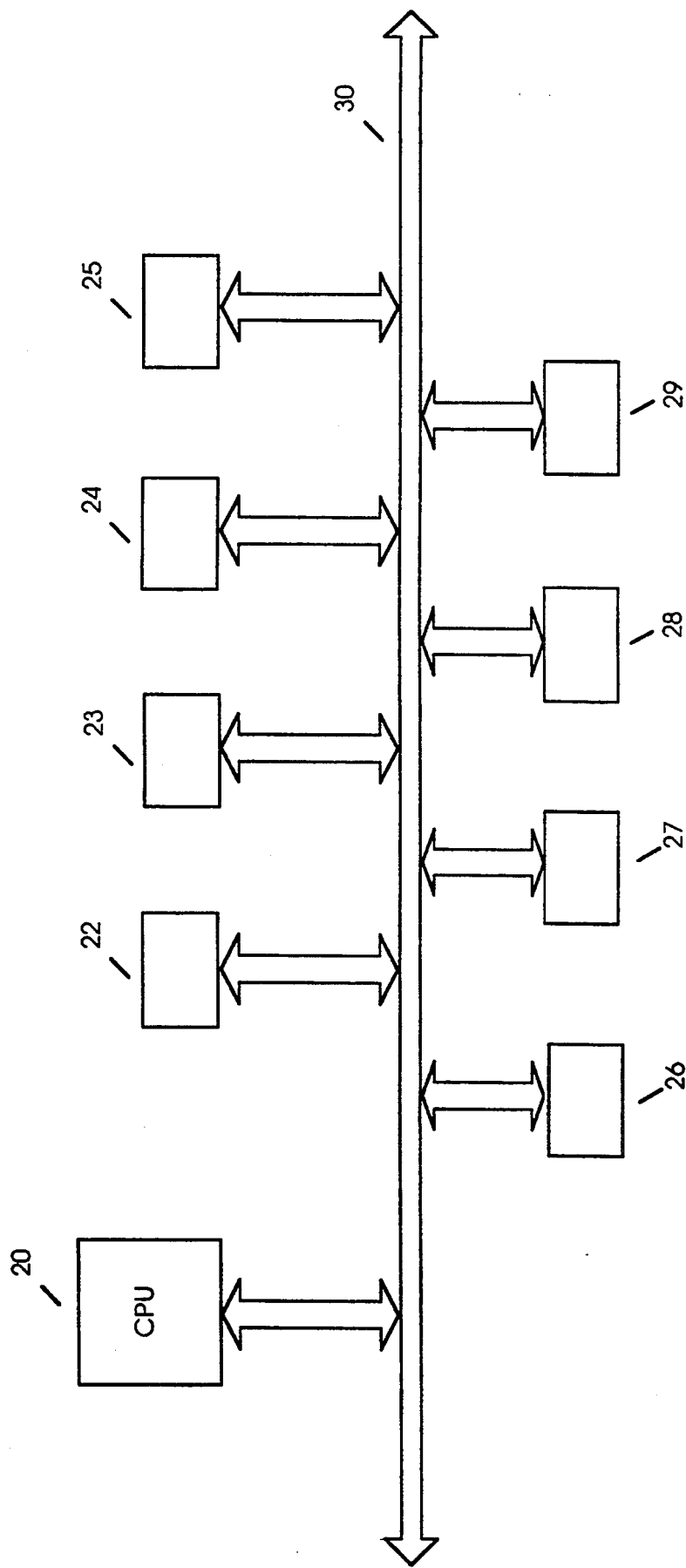
FIG. 1 is a block diagram illustrating a computer system employing the teachings of the present invention, including a CPU and eight adapters coupled to a bus.

Referring now to FIG. 1, a computer system employing the teachings of the present invention is illustrated. A central processing unit (CPU) 20 is shown coupled to a bus 30. A set of hardware adapters 22-29 are also shown coupled to the bus 30. For example, the hardware adapters 22-29 may be disk drive controllers, network controllers and graphics controllers. Each of the adapters 22-29 contains a set of internal registers mapped to an I/O address space of the bus 30. The CPU 20 configures and controls the adapters 22-29 by accessing the internal registers.

In the current embodiment, eight hardware slots are available for coupling the adapters 22-29 to the bus 30.

The I/O space of the bus 30 comprises sixteen address bits. The I/O address mapping for the internal registers of each adapter 22-29 may be programmed in hardware, or selected by switch settings or jumpers located on the adapters.

The present method and apparatus enables system I/O software to detect I/O address conflicts among the internal registers of the adapters 22-29, and to reallocate the I/O address mapping of the internal registers to eliminate the conflicts. Adapters that implement the current method and apparatus are hereinafter referred to as automatic conflict resolution (ACR) adapters. Adapters that do not implement the present method and apparatus are hereinafter referred to as non ACR adapters. Each of the adapters 22-29 may be either an ACR adapter, or a non ACR adapter. In the current embodiment, ACR adapters decode all sixteen I/O address bits of the bus 30, while typical non ACR adapters decode only the lower 10 bits of the I/O address. However, the present method and apparatus for automatically resolving I/O address conflicts among adapters also operates on non ACR adapters that decode all sixteen I/O address bits of the bus 30.

In the current embodiment, each ACR adapter contains 16 internal registers located at offsets 0 through F hex from a base I/O address. The 16 possible base I/O addresses for ACR adapters are 200 hex, 210 hex, 220 hex, 230 hex, 240 hex, 250 hex, 260 hex, 270 hex, 300 hex, 310 hex, 320 hex, 330 hex, 340 hex, 350 hex, 360 hex, and 370 hex. The 16 possible base I/O addresses correspond to 16 possible I/O address spaces for mapping the ACR adapters. However, the number of internal registers contained in the ACR adapters, and the possible base I/O addresses is arbitrary. It will be appreciated that a wide variety of internal register configurations, as well as arrangements of base I/O addresses may be used without departing from the spirit and scope of the present method.

Each ACR adapter contains an EEPROM which stores configuration information for the adapter. The configuration information includes the base I/O address for the ACR adapter, and a unique address identifier for the ACR adapter. The unique address identifier is a binary number that is different from the unique address identifiers of other ACR adapters, i.e. that uniquely identifies an ACR adapter. In the current embodiment, the unique address identifier is an ethernet address for the ACR adapter.

For each ACR adapter, an EEPROM control register is located at offset E hex from the base I/O address. The EEPROM control register contains control bits for serially reading and writing the contents of the EEPROM. The control bits include the following: bit 0—chip select, bit 2—EEPROM clock, bit 2—serial data out, bit 3—serial data in. Also, a hardware ID register is located at offset F hex from the base I/O address. An I/O read to the hardware ID register causes an ACR adapter to return a predetermined hardware identifier which is common to all ACR adapters.

Each ACR adapter implements a bit switch function for "switching on" and "switching off" the ACR adapter according to the state of bits shifted out of the EEPROM through the EEPROM control register. If the bit shifted out of the EEPROM is a "1", then the ACR adapter switches off. If the bit shifted out is a "0", then the ACR adapter remains switched on. The system I/O software writes to the serial data in bit of a bit switch control register to enable and disable the bit switch function. In the current embodiment, the bit switch control register is located at offset 3XXE hex. As will be described, the switched off ACR adapters do not respond to the I/O reads used by the system I/O software to test for I/O address space conflicts, and to shift I/O address space.

Also, each ACR adapter implements two sets of shadow registers for testing I/O address space conflicts with non ACR adapters. A first set of shadow registers are located at offsets 1000 through 100F hex from the base I/O address of the ACR adapter. An I/O read to the first set of shadow registers causes the ACR adapter to drive the value FF hex over the bus 30. A second set of shadow registers are located at offsets 2000 through 200 F hex from the base I/O address of the ACR adapter. An I/O read to the second set of shadow registers causes the ACR adapters to drive the value 00 hex over the bus 30.

Figure 2:
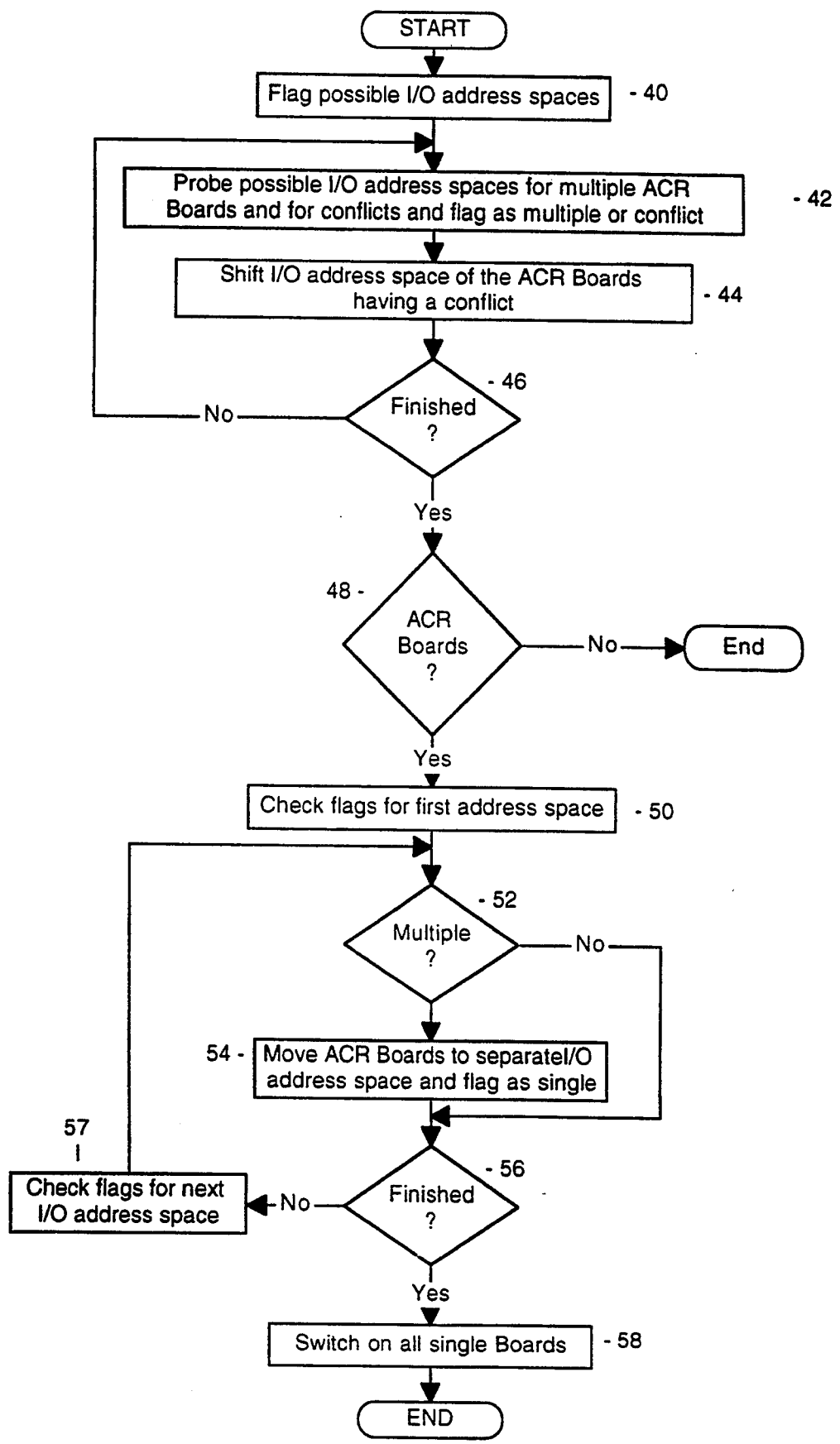
FIG. 2 is a flow diagram illustrating the present method for automatically resolving I/O address conflicts among adapters coupled to a common bus.

Referring to FIG. 2, a flow diagram illustrating the present method for automatically resolving I/O address conflicts among adapters coupled to a common bus is shown. In the current embodiment, the method for conflict resolution is implemented in system I/O software executed by the CPU 20.

For purposes of illustration, the present method is described below with respect to the example adapters 22-24,26 and 27. For this example, the adapters 22 and 23 are both ACR adapters having a factory preset base I/O address of 300 hex. The adapter 24 is an ACR adapter having a preset base I/O address of 310 hex. The adapter 26 is a non ACR adapter having a base I/O address of 300 hex, and the adapter 27 is a non ACR adapter having a base I/O address of 310 hex.

At block 40, the system I/O software sets a "not used" status flag for each of the 16 possible I/O address spaces for ACR adapters. The not used status flags indicate that the possible I/O address spaces are initially assumed unused by the adapters 22-29. In this example, the not used status flags corresponding to the I/O address spaces at 300 and 310 hex are set, as well as the not used status flags for the other 14 possible I/O address spaces.

At block 42, the system I/O software probes the possible I/O address spaces for ACR adapters. For each possible I/O address space, if the system I/O software detects an ACR adapter having an I/O address space conflict with a non ACR adapter, then a "conflict" status flag corresponding to the I/O address space is set. The conflict status flag indicates that at least one ACR adapter occupies the corresponding I/O address space. At this point, the number of ACR adapters in conflict with the non ACR adapter is unknown, since ACR adapters at the same I/O address space respond identically to probing by the system I/O software.

For each possible I/O address space, if the system I/O software detects an ACR adapter not having an I/O address space conflict with a non ACR adapter, then a "multiple" status flag corresponding to the I/O address space is set. The multiple status flag indicates that at least one ACR adapter occupies the corresponding I/O address space. The number of ACR adapters at the I/O address space is unknown.

Thereafter, the system I/O software "switches on" the ACR adapters at the I/O address spaces having a conflict with a non ACR adapter. The ACR adapters in conflict are switched on to enable shifting of the I/O address spaces in block 44. On the other hand, the system I/O software "switches off" the ACR adapters at the I/O address spaces having the multiple status flag set in order to prevent I/O address space shifting in block 44.

For the present example, the system I/O software detects an I/O address space conflict at 300 hex, and sets the corresponding conflict flag. The system I/O software switches on the ACR adapters 22 and 23, which correspond to the I/O address space of 300 hex. Also, the system I/O software detects an I/O address space conflict at 310 hex, sets the corresponding conflict flag, and switches on the ACR adapter 24, which is at 310 hex.

At block 44, the system I/O software shifts the I/O address spaces for ACR adapters having the conflict status flag set, in order to eliminate the conflict with non ACR adapters. In the current embodiment, the system I/O software performs eight consecutive I/O reads to a predetermined set of eight I/O addresses to signal the ACR adapters to shift I/O address space. The predetermined set of I/O addresses for shifting I/O address space comprises 25 F hex, 21F hex, 27 F hex, 23 F hex, 34 F hex, 30 F hex, 36 F hex, and 32 F hex. However, it will be appreciated that many other patterns of I/O addresses may be used within the scope of the present method.

Each ACR adapters has a state machine that monitors for the set of eight consecutive I/O reads issued by the system I/O software. When the state machine of each switched on ACR adapter recognizes the proper sequence of I/O reads, control logic in the ACR adapter shifts up the I/O address space for the ACR adapter by 10 HEX from the base I/O address. Only the ACR adapters that are switched on recognize the series of I/O reads.

For the present example, the system I/O software performs the predetermined set of 8 consecutive I/O reads. The state machines of the ACR adapters 22–24, which were switched on at the end of block 42, recognize the series of I/O reads. In response, the ACR adapters 22 and 23 shift I/O address space from 300 hex to 310 hex, while the ACR adapter 24 shifts I/O address space from 310 hex to 320 hex.

The steps of blocks 42 and 44 are repeated to ensure that all ACR adapters are moved out of conflict with the non ACR adapters. In the current embodiment, the sequence from blocks 42–44 is repeated eight times to ensure that all ACR adapters are moved out of conflict, since there are eight adapter slots and sixteen possible I/O locations. At decision block 46, if the sequence from blocks 42–44 has completed 8 loops, control proceeds to decision block 48.

It will be appreciated that ACR adapters may be shifted from one conflict I/O address space to another during block 44. For example, the first time through block 44, the ACR adapters 22 and 23 are shifted from a conflict with the non ACR adapter 26 at 300 hex to a conflict with the non ACR adapter 27 at 310 hex.

During the second pass through block 42, the system I/O software detects a conflict between the non ACR adapter 310, and the ACR adapters 22 and 23 at I/O address space 310 hex. Accordingly, the system I/O software sets the conflict status flag corresponding to I/O address space 310 hex. The system I/O software detects the ACR adapter 24 at I/O address space 320 without a conflict, and sets the corresponding multiple status flag for I/O address space 320. The system I/O software switches on the ACR adapters 22 and 23, and switches off the ACR adapter 24.

During the second pass through block 44, the ACR adapters 22 and 23 are shifted from I/O address space 310 hex to 320 hex. During the third pass through block 42, the system I/O software detects the ACR adapters 22–24 at I/O address space 320 hex without a conflict with a non ACR adapter. Accordingly, the system I/O software sets the multiple status flag corresponding to the I/O address space 320 hex, and switches off the ACR adapters 22–24. Since the ACR adapters are off, no I/O address shifting occurs during subsequent passes through block 44.

At decision block 48, if ACR adapters have been detected in the block 42–44 loop, then control proceeds to block 50. The system I/O software tests the multiple status flags for all possible I/O address spaces to determine whether ACR adapters have been detected. If at least one multiple status flag is set then control proceeds to block 50.

Blocks 50–57 comprise a loop, wherein the system I/O software sequentially tests the status flags for each of the I/O address spaces. At block 52, if the multiple status flag is set for a particular I/O address space, then control proceeds to block 54. At block 54, the system I/O software moves the ACR adapters at the particular I/O address space to separate unused I/O address spaces, and sets a corresponding "single" status flag. Thereafter, at block 58 the system I/O software switches on the ACR adapters at I/O address spaces having the single status flag set. The ACR adapters are switched on to enable normal adapter functions.

Figure 3:
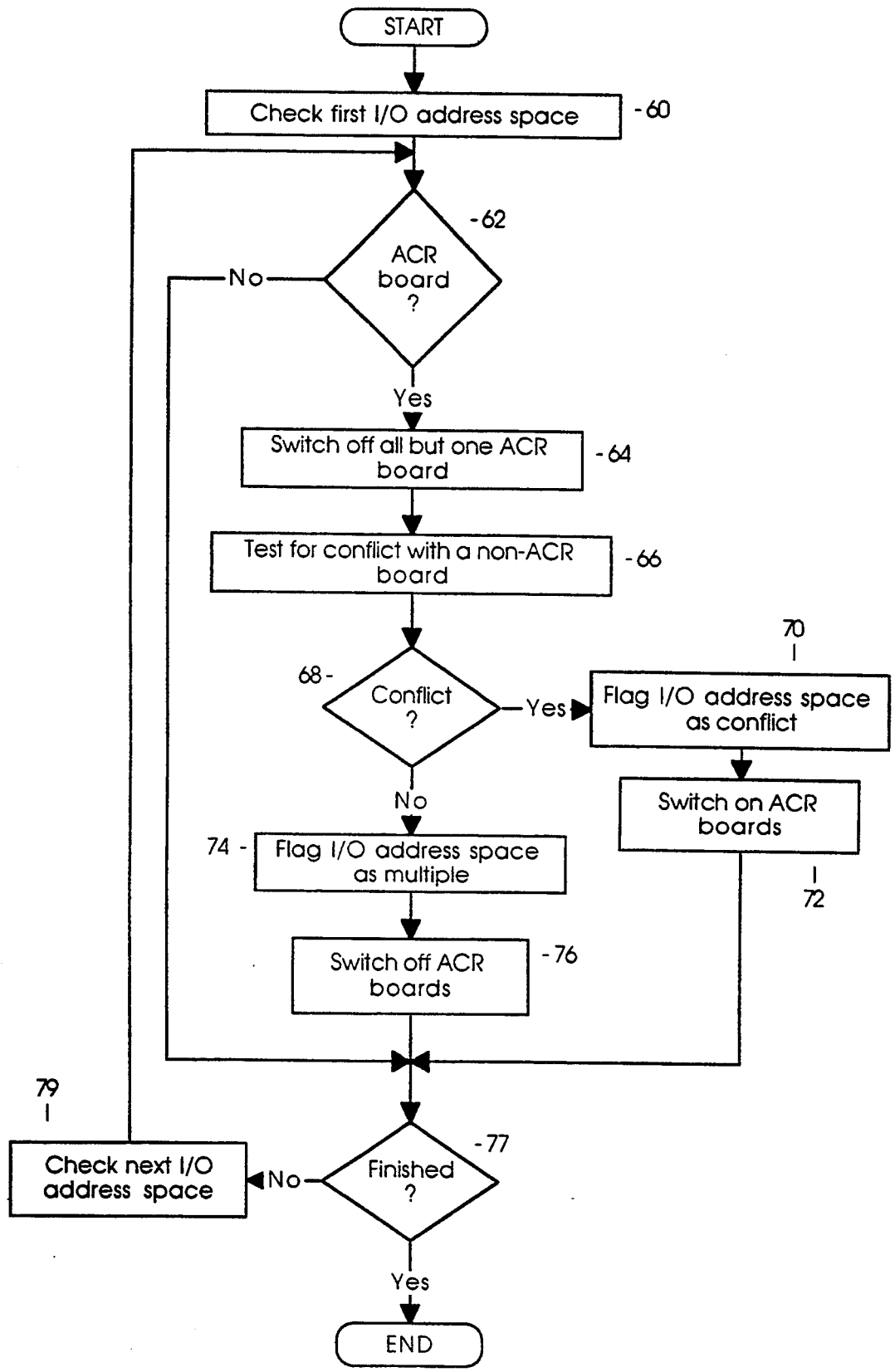
FIG. 3 is a flow diagram illustrating the method for probing the I/O address spaces for ACR adapters, and for detecting conflicts with non ACR adapters.

FIG. 3 is a flow diagram illustrating the method of block 42 for probing the I/O address spaces for ACR adapters, and for detecting conflicts with non ACR adapters. Blocks 60 through 79 comprise a loop, wherein the system I/O software sequentially probes each of the 16 possible I/O address spaces.

At decision block 62, if the system I/O software detects an ACR adapter at the I/O address space, then control proceeds to block 64. The system software detects an ACR adapter by performing an I/O read at offset F hex in the I/O address space. If the system I/O software reads the hardware ID,-then at least one ACR adapter in the I/O address space is responding. At decision block 62, if the system I/O software does not detect an ACR adapter at the I/O address space, then control proceeds to block 77 to check the next possible I/O address space.

At block 64, the system I/O software switches off all but one of the ACR adapters corresponding to the I/O address space. To detect a conflict with non ACR adapters, only one ACR adapter is switched on. It will be appreciated that if multiple ACR adapters were switched on, then the ACR adapters are likely to win bus contentions with non ACR adapters, which would make the task of detecting conflicts more difficult.

At block 66, the system I/O software tests for a conflict between the ACR adapter that remains switched on, and a non ACR adapter. In the current embodiment, the system I/O software tests for a conflict by reading the shadow registers located in the ACR adapter. The system I/O software reads the first set of shadow registers at offsets 1000 through 100 F hex from the base I/O address of the ACR adapter. The ACR adapter responds by driving FF hex onto the bus 30. However, a non ACR adapter having the same I/O address space decodes only the lower 10 bits of the I/O address. As a result, the non ACR adapter responds by driving the contents of its internal registers onto the bus 30. Thus, if the system I/O software does not read FF hex for all registers of the first set of shadow registers, then a bus conflict with a non ACR adapters occurred.

Similarly, the system I/O software reads the second set of shadow registers at offsets 2000 through 200 F hex from the base I/O address of the ACR adapter. The ACR adapter responds by driving 00 hex onto the bus 30. However, the non ACR adapter responds by driving the contents of its internal registers onto the bus 30. Thus, if the system I/O software does not read 00 hex for all registers of the second set of shadow registers, then a bus conflict with a non ACR adapters occurred.

At decision block 68, if the system I/O software detected a bus conflict between the ACR adapter and a non ACR adapter, then control proceeds to block 70 where the conflict status flag is set. Thereafter, at block 72 the system I/O software switches on all the ACR adapters at the I/O address space to enable I/O address space shifting in block 44.

At decision block 68, if the system I/O software did not detect a conflict between the ACR adapter and a non ACR adapter, then control proceeds to block 74 where the multiple status flag is set. Thereafter, at block 76 the system I/O software switches off the ACR adapters at the I/O address space to prevent I/O address space shifting in block 44. Decision block 77 ensures that all of the possible I/O address spaces are checked.

Figure 4:
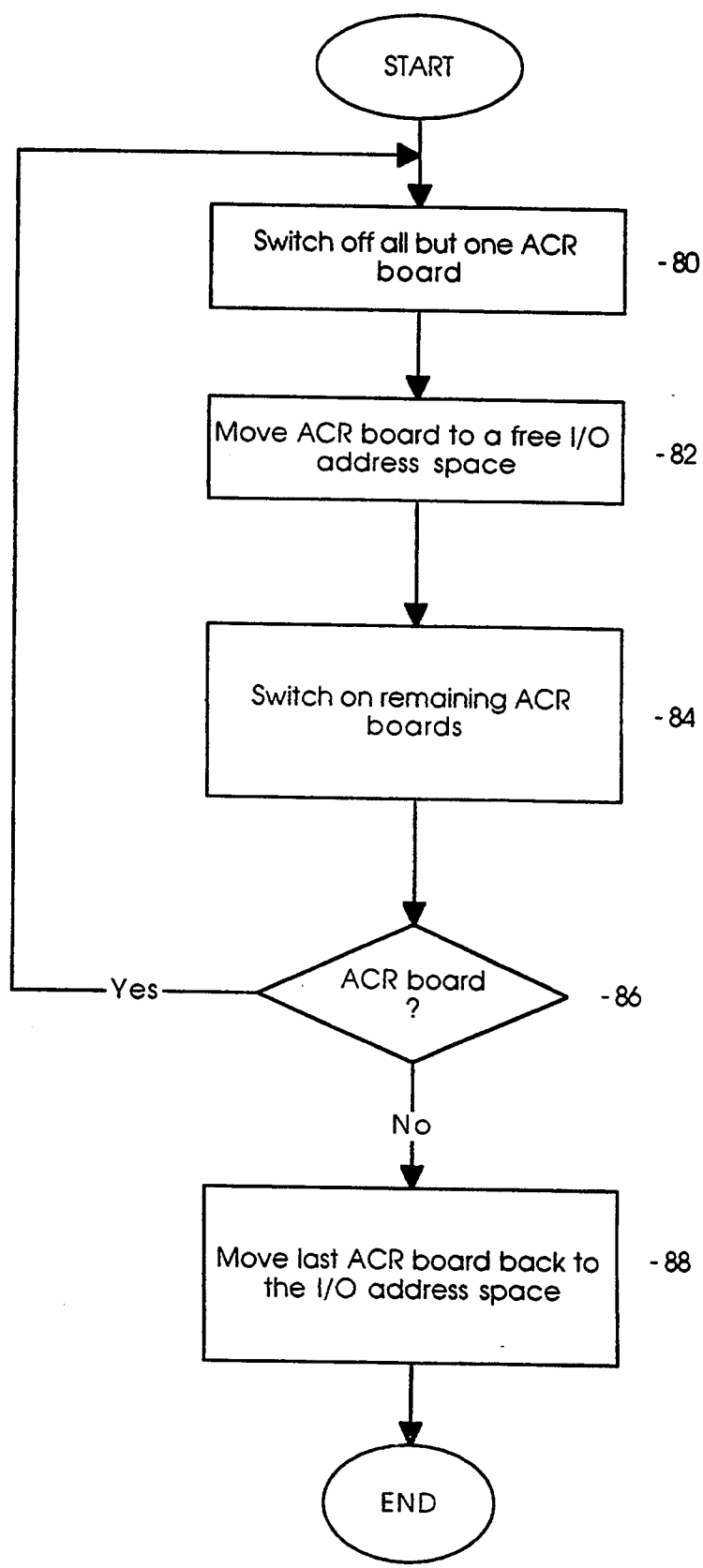
FIG. 4 is a flow diagram illustrating the method for moving multiple ACR adapters at a common I/O address space to separate unused I/O address spaces.

FIG. 4 is a flow diagram illustrating the method of block 54 for moving multiple ACR adapters at a common I/O address space to separate unused I/O address spaces. At block 80, the system I/O software switches off all but one ACR adapter at the common I/O address space.

At block 82 the system I/O software moves the remaining switched on ACR adapter to a new I/O address space having the not used status flag set, and not having an I/O address space conflict with a non ACR adapter. Also, the system I/O software sets a "single" status flag corresponding to the new I/O address space, and stores the new I/O base address in the EEPROM of the switched on ACR adapter. Thereafter, at block 84 the system I/O software switches on the ACR adapters remaining at the common I/O address space.

At decision block 86, if the system I/O software detects ACR adapters at the common I/O address space, then control proceeds back to block 80 to move another ACR adapter to an unused I/O address space. At decision block 86, if the system I/O software does not detect ACR adapters at the common I/O address space, then control proceeds to block 88. At block 88, the system I/O software moves the last ACR adapter that was moved during block 82 back to the common I/O address space.

Figure 5:
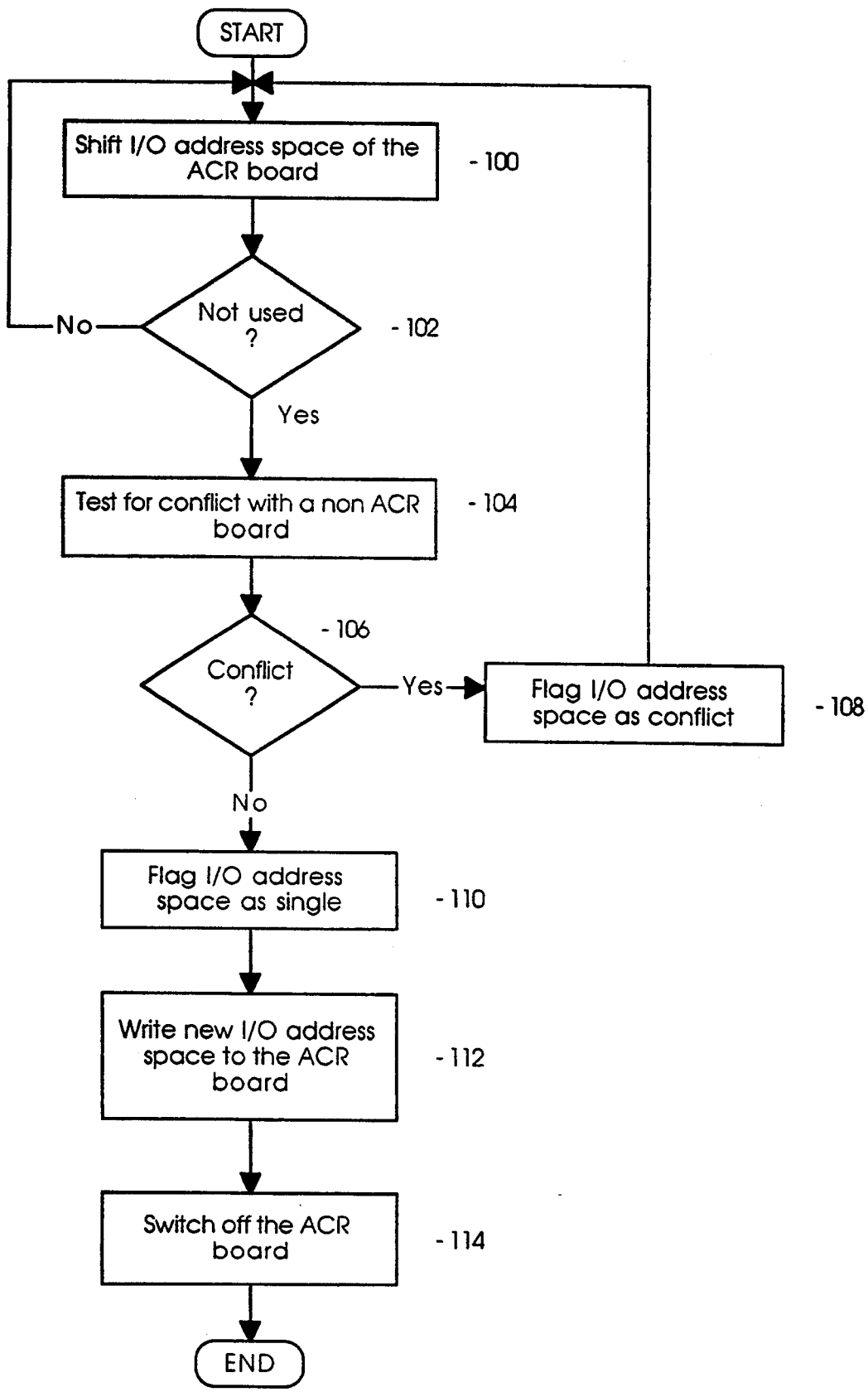
FIG. 5 is a flow diagram illustrating the method for moving an ACR adapter to an unused I/O address space.

FIG. 5 is a flow diagram illustrating the method of block 82 for moving an ACR adapter to an unused I/O address space. At block 100, the system I/O software shifts the I/O address space of the ACR adapter by performing eight consecutive I/O reads to the predetermined set of eight I/O addresses, as discussed above for block 44.

At decision block 102, if the not used status flag corresponding to the shifted I/O address space for the ACR adapter is set, then control proceeds to block 104. Otherwise, control proceeds back to block 100 to shift the I/O address space of the ACR adapter again. At block 104, the system I/O software tests for a conflict at the shifted I/O address space between the ACR adapter and a non ACR adapter, in the manner discussed above in block 66.

At decision block 106, if the system I/O software detected a conflict at the shifted I/O address space, then control proceeds to block 108 where the conflict status flag is set. Thereafter, control proceeds back to block 100 where the I/O address space for the ACR adapter is again shifted up by 10 HEX. At decision block 106, if the system I/O software did not detect a conflict at the shifted I/O address space, then control proceeds to block 110.

At block 110, the system I/O software sets the single status flag corresponding to the shifted I/O address space. Thereafter, at block 112 the base I/O address of the shifted I/O) address space is stored into the EEPROM on the ACR adapter. At block 114, the ACR adapter is switched off to disable further shifting of the I/O address space.

Figure 6:
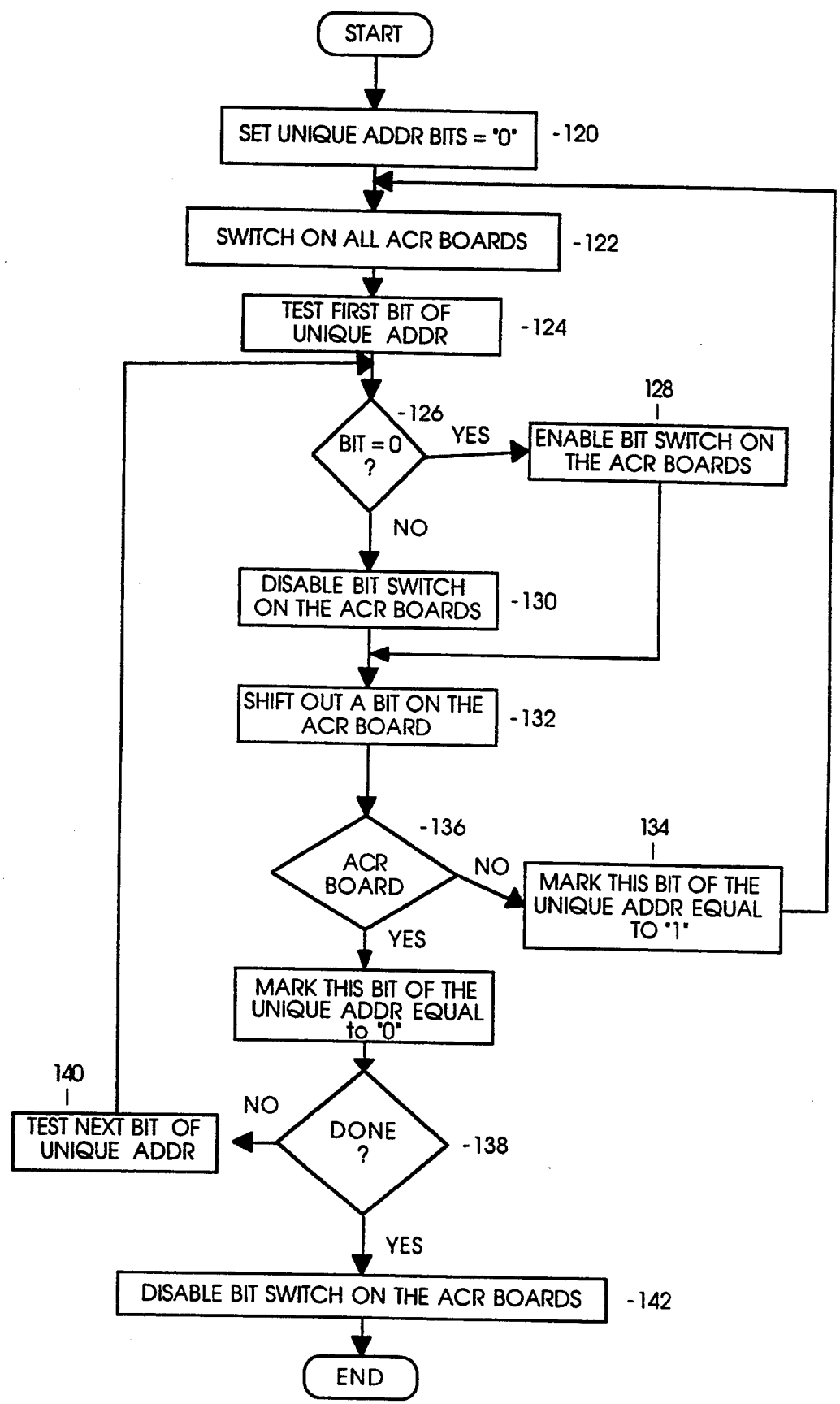
FIG. 6 is a flow diagram illustrating the method for "switching off" all but one of the ACR adapters at an I/O address space by using the bit switch function implemented on each of the ACR adapters.

FIG. 6 is a flow diagram illustrating the method of blocks 64 and 80 for "switching off" all but one of the ACR adapters at an I/O address space. The current embodiment uses the bit switch function implemented on each of the ACR adapters, while shifting the lower 24 bits of the unique address identifier from the EEPROMs of the ACR adapters.

At block 120, the system I/O software initializes a local copy of the lower 24 bits of a unique address identifier (UNIQUE ADDR) to zero. At block 122, the system I/O software switches on the ACR adapters at the I/O address space by asserting the chip select and the serial data in bits of the EEPROM control register at the I/O address space. Thereafter, at block 124 the system I/O software tests the first bit of the UNIQUE ADDR.

At decision block 126, if the tested bit of the UNIQUE ADDR equals zero, then control proceeds to block 128. At block 128, the system I/O software enables the bit switch function by writing a "1" to the bit switch control register. At decision block 126 if the tested bit of the UNIQUE ADDR is not zero, then control proceeds to block 130. At block 130, the system I/O software disables the bit switch function by writing a "0" to the bit switch control register. Control then proceeds to block 132.

At block 132, the system I/O software shifts one bit of the lower 24 bits of the unique address identifier out of the EEPROMs on the ACR adapters at the I/O address space. If the bit shifted out of the EEPROM of an ACR adapter is a "1", then the ACR adapter is switched off. If the bit shifted out of the EEPROM of an ACR adapter is a "0", then the ACR adapter remains switched on.

At decision block 136, the system I/O software detects whether at least one ACR adapter remains switched on. The system software detects an ACR adapter by performing an I/O read at offset F hex of the I/O address space. If the system I/O software does not read the hardware ID, then all of the ACR adapters at the I/O address space are switched off, and control proceeds to block 134. At block 134, the corresponding bit of the UNIQUE ADDR is set to "1". Control then proceeds back to block 122, where the system I/O software switches on the ACR adapters at the I/O address space, and the above sequence repeats.

At decision block 136, if the system I/O software reads the hardware ID, then at least one ACR adapter is switched on, and control proceeds to decision block 138. At decision block 138, if all bits of the UNIQUE ADDR have not been tested, then control proceeds to block 140, where the next bit of the UNIQUE ADDR is tested. Control then proceeds back to decision block 126 to perform the bit switch function for the next bit of the UNIQUE ADDR.

At decision block 138, if all of the bits of the UNIQUE ADDR have been tested, then control proceeds to block 142. At block 142, the bit switch function for the ACR adapters at the I/O address space is disabled. At this point, only one of the ACR adapters at the I/O address space remains switched on.

In the foregoing specification, the invention has been described with reference to specific exemplary embodiments thereof. It will, however, be evident that various modifications and changes may be made thereto without departing from the broader spirit and scope of the invention as set forth in the independent claims. The specification and drawings are accordingly to be regarded as an illustrative, rather than in a restrictive sense.

What is claim is:

1. A method for resolving address conflicts among adapters in a computer system, comprising the steps of:
    determining an address space on a system bus for each of a set of adapters that each implement a set of automatic conflict resolution functions, wherein the automatic conflict resolution functions include a bit switch function for switching on and switching off the corresponding adapter and an address shift function for shifting the address space of the corresponding adapter;
    testing for address conflicts on the system bus between the address spaces of the adapters that implement the automatic conflict resolution functions and adapters that do not implement the automatic conflict resolution functions such that the adapters that implement the automatic conflict resolution functions and that do not have the address conflicts are disabled using the bit switch function;
    shifting the address space of each adapter that implements the automatic conflict resolution functions to a next sequential address space of a predetermined set of address spaces available on the system bus using the address shift function on the adapters that implement the automatic conflict resolution functions and that are switched on;
    repeating the steps of testing for address conflicts and shifting the address space of each adapter that implements the automatic conflict resolution functions a predetermined number of times, such that the adapters that implement the automatic conflict resolution functions are shifted out of address conflict with the adapters that do not implement the automatic conflict resolution functions;
    mapping the address space of each adapter that implements the automatic conflict resolution functions, such that the address spaces do not overlap.

2. The method of claim 1, wherein for each address space the step of testing for conflicts on the system bus comprises the steps of:
    probing the address space for the adapters that implement the automatic conflict resolution functions;
    switching off all but one of the adapters that implement the automatic conflict resolution functions that are mapped to the address space using the bit switch function;
    testing for address conflicts on the system bus between the address space of the adapter that implements the automatic conflict resolution functions and that remains switched on, and adapters that do not implement the automatic conflict resolution functions;
    switching on the adapters that implement the automatic conflict resolution functions using the bit switch function that are mapped to the address space if the address conflict is detected;
    disabling the adapters that implement the automatic conflict resolution functions using the bit switch function that are mapped to the address space if the address conflict is not detected.

3. The method of claim 2, wherein the step of probing the address space for the adapters that implement the automatic conflict resolution functions comprises the step of reading a hardware identifier for the automatic conflict resolution functions from a predetermined offset within the address space.

4. The method of claim 2, wherein the step of switching off all but one of the adapters that implement the automatic conflict resolution functions comprises the steps of:
    shifting a unique identifier for each adapter that implements the automatic conflict resolution functions through the corresponding bit switch function such that an individual bit of each unique identifier switches on or switches off the corresponding adapter according to a logic state of the individual bit;
    probing the address space for the adapters that implement the automatic conflict resolution functions after each individual bit is shifted through the corresponding bit switch function and disabling the bit switch function on each adapter that implements the automatic conflict resolution functions if the adapters that implement the automatic conflict resolution functions are not detected.

5. The method of claim 2, wherein the step of testing for address conflicts on the system bus between the address space of the adapter that implements the automatic conflict resolution functions and that remains switched on, and adapters that do not implement the automatic conflict resolution functions comprises the steps of:
    reading a set shadow registers located in the adapter that implements the automatic conflict resolution functions;
    verifying that the data read from the set of shadow register correspond to predefined values for the automatic conflict resolution functions.

6. The method of claim 1, wherein the step of shifting the address space of each adapter that implements the automatic conflict resolution functions comprises the step of transferring a series of read transactions over the system bus to a predetermined address sequence for the address shift function such that each adapter that implements the automatic conflict resolution functions shifts the corresponding address space up to a next sequential address space of the predetermined set of address spaces available on the system bus.

7. The method of claim 1, wherein the step of mapping the address space of each adapter that implements the automatic conflict resolution functions comprises the steps of:
    switching off all but one of the adapters that implement the automatic conflict resolution functions that are mapped to the address space using the bit switch function;

mapping the address space for the remaining switched on adapters that implement the automatic conflict resolution functions to an unused address space;

switching on the adapters that implement the automatic conflict resolution functions that are mapped to the address space using the bit switch function;

probing the address space for the adapters that implement the automatic conflict resolution functions and mapping the adapters that implement the automatic conflict resolution functions from the unused address space back to the address space if the adapters are not detected at the address space.

8. An apparatus for resolving address conflicts among adapters in a computer system, comprising:

means for determining an address space on a system bus for each of a set of adapters that each implement a set of automatic conflict resolution functions, wherein the automatic conflict resolution functions include a bit switch function for switching on and switching off the corresponding adapter and an address shift function for shifting the address space of the corresponding adapter;

means for testing for address conflicts on the system bus between the address spaces of the adapters that implement the automatic conflict resolution functions and adapters that do not implement the automatic conflict resolution functions such that the adapters that implement the automatic conflict resolution functions and that do not have the address conflicts are disabled using the bit switch function;

means for shifting the address space of each adapter that implements the automatic conflict resolution functions to a next sequential address space of a predetermined set of address spaces available on the system bus using the address shift function on the adapters that implement the automatic conflict resolution functions and that are switched on;

means for mapping the address space of each adapter that implements the automatic conflict resolution functions, such that the address spaces do not overlap.

9. The apparatus of claim 8, wherein the means for testing for conflicts on the system bus comprises:

means for probing the address space for the adapters that implement the automatic conflict resolution functions;

means for switching off all but one of the adapters that implement the automatic conflict resolution functions that are mapped to the address space using the bit switch function;

means for testing for address conflicts on the system bus between the address space of the adapter that implements the automatic conflict resolution functions and that remains switched on, and adapters that do not implement the automatic conflict resolution functions;

means for switching on the adapters that implement the automatic conflict resolution functions using the bit switch function that are mapped to the address space if the address conflict is detected;

means for disabling the adapters that implement the automatic conflict resolution functions using the bit switch function that are mapped to the address space if the address conflict is not detected.

10. The apparatus of claim 9, wherein the means for probing the address space for the adapters that implement the automatic conflict resolution functions comprises means for reading a hardware identifier for the automatic conflict resolution functions from a predetermined offset within the address space.

11. The apparatus of claim 9, wherein the means for switching off all but one of the adapters that implement the automatic conflict resolution functions comprises:

means for shifting a unique identifier for each adapter that implements the automatic conflict resolution functions through the corresponding bit switch function such that an individual bit of each unique identifier switches on or switches off the corresponding adapter according to a logic state of the individual bit;

means for probing the address space for the adapters that implement the automatic conflict resolution functions after each individual bit is shifted through the corresponding bit switch function and disabling the bit switch function on each adapter that implements the automatic conflict resolution functions if the adapters that implement the automatic conflict resolution functions are not detected.

12. The apparatus of claim 9, wherein the means for testing for address conflicts on the system bus between the address space of the adapter that implements the automatic conflict resolution functions and that remains switched on, and adapters that do not implement the automatic conflict resolution functions comprises:

means for reading a set shadow registers located in the adapter that implements the automatic conflict resolution functions;

means for verifying that the data read from the set of shadow register correspond to predefined values for the automatic conflict resolution functions.

13. The apparatus of claim 8, wherein the means for shifting the address space of each adapter that implements the automatic conflict resolution functions comprises means for transferring a series of read transactions over the system bus to a predetermined address sequence for the address shift function such that each adapter that implements the automatic conflict resolution functions shifts the corresponding address space up to a next sequential address space of the predetermined set of address spaces available on the system bus.

14. The apparatus of claim 8, wherein the means for mapping the address space of each adapter that implements the automatic conflict resolution functions comprises:

means for switching off all but one of the adapters that implement the automatic conflict resolution functions that are mapped to the address space using the bit switch function;

means for mapping the address space for the remaining switched on adapters that implement the automatic conflict resolution functions to an unused address space;

means for switching on the adapters that implement the automatic conflict resolution functions that are mapped to the address space using the bit switch function;

means for probing the address space for the adapters that implement the automatic conflict resolution functions and mapping the adapters that implement the automatic conflict resolution functions from the unused address space back to the address space if the adapters are not detected at the address space.

15. An adapter that implements automatic conflict resolution functions for a computer system, comprising:
nonvolatile memory that stores a unique identifier for the adapter;
a set of internal registers located at an address space on a system bus specified by a base address for the adapter;
means for monitoring the system bus for a predetermined series of accesses on the system bus, the predetermined series of accesses causing the base address for the adapter to shift by a predetermined value;
means for shifting a bit of the unique identifier out of the nonvolatile memory and means for switching off the adapter if the bit is in a first state and for switching on the adapter if the bit is in a second state.

16. The adapter of claim 15, further comprising a bit switch control register for enabling and disabling the means for shifting a bit of the unique identifier out of the nonvolatile memory and the means for switching off the adapter.

17. The adapter of claim 15, wherein the internal registers include a control register for switching on and switching off the adapter, and for reading and writing the nonvolatile memory over the system bus.

18. The adapter of claim 15, wherein the internal registers include a hardware identifier register that stores a value indicating that the adapter implements the automatic conflict resolution functions.

19. The adapter of claim 15, wherein the predetermined series of accesses on the system bus comprises a series of read transactions targeted for a set of predetermined addresses on the system bus.

20. The adapter of claim 15, further comprising a first set of shadow registers that drive the system bus to a first predetermined value in response to a read transaction on the system bus targeted for the first set of shadow registers.

21. The adapter of claim 20, further comprising a second set of shadow registers that drive the system bus to a second predetermined value in response to a read transaction on the system bus targeted for the second set of shadow registers.

* * * * *

UNITED STATES PATENT AND TRADEMARK OFFICE
CERTIFICATE OF CORRECTION

PATENT NO. : 5,386,515
DATED : January 31, 1995
INVENTOR(S) : Martin et al.

It is certified that error appears in the above-indentified patent and that said Letters Patent is hereby corrected as shown below:

In column 3 at line 54 delete "bit 2--EEPROM" and insert --bit 1--EEPROM--

In column 6 at line 42 delete "ID,-then" and insert --ID, then--

Signed and Sealed this

Twelfth Day of November, 1996

Attest:

BRUCE LEHMAN

Attesting Officer

Commissioner of Patents and Trademarks